(12) United States Patent
Pellegrin (10) Patent No.: US 7,854,791 B2
(45) Date of Patent: Dec. 21, 2010

(54) METHOD AND MEANS FOR SIMULTANEOUSLY GENERATING AN AQUEOUS FROTH AND NUMEROUS MICRO-DROPLETS FOR USE IN FILTERING A CONTAMINATED AIR STREAM

(75) Inventor: Roy J. Pellegrin, Maui, HI (US)

(73) Assignee: Westec Environmental Solutions LLC, Chicago, IL (US)

( * ) Notice: Subject to any disclaimer, the term of this patent is extended or adjusted under 35 U.S.C. 154(b) by 882 days.

(21) Appl. No.: 11/729,253

(22) Filed: Mar. 28, 2007

(65) Prior Publication Data

US 2008/0017032 A1 Jan. 24, 2008

Related U.S. Application Data

(60) Provisional application No. 60/786,593, filed on Mar. 28, 2006.

(51) Int. Cl.
*B01D 47/00* (2006.01)
(52) U.S. Cl. .............................. 95/150; 95/214; 95/226; 96/257; 96/274; 96/279; 96/296; 96/352
(58) Field of Classification Search .................. 95/150, 95/226, 214; 96/279, 333, 337, 339, 340–343, 96/351–352, 243, 257, 366, 274, 296
See application file for complete search history.

(56) References Cited

U.S. PATENT DOCUMENTS

| 972,183 | A | * | 10/1910 | Guntrum | 261/124 |
|---|---|---|---|---|---|
| 996,991 | A | * | 7/1911 | Little | 96/353 |
| 1,810,394 | A | * | 6/1931 | Dyhr | 261/100 |
| 1,838,645 | A | * | 12/1931 | Voigt | 181/260 |
| 1,860,111 | A | * | 5/1932 | Miller | 261/106 |
| 1,994,766 | A | * | 3/1935 | Heglar | 96/279 |
| 2,069,889 | A | * | 2/1937 | Lowther | 96/335 |
| 2,172,710 | A | * | 9/1939 | Lippert | 261/122.1 |
| 2,207,689 | A | * | 7/1940 | Baker | 261/122.1 |
| 2,466,162 | A | * | 4/1949 | Dupuy | 434/370 |
| 2,575,400 | A | * | 11/1951 | Shirk et al. | 96/341 |
| 3,231,251 | A | * | 1/1966 | Scheibel | 261/114.1 |
| 3,811,247 | A | * | 5/1974 | Huppke | 96/177 |
| 4,140,635 | A | * | 2/1979 | Esmond | 210/177 |
| 6,616,733 | B1 | * | 9/2003 | Pellegrin | 95/150 |
| 6,872,240 | B2 | * | 3/2005 | Pellegrin | 95/150 |
| 2003/0177904 | A1 | * | 9/2003 | Broadbent | 95/154 |

* cited by examiner

*Primary Examiner*—Duane Smith
*Assistant Examiner*—Ives Wu
(74) *Attorney, Agent, or Firm*—Bruce H Johnsonbaugh (57) ABSTRACT

A method and apparatus are provided for improving the efficiency of an aqueous froth filter. An array of saturated mesh assemblies interacts with an incoming contaminated air stream. As the air stream flows through the saturated mesh assemblies, an aqueous froth is generated immediately downstream of each mesh assembly. As the bubbles of the froth move downstream towards the next saturated mesh assembly, the velocity of the air stream causes at least some of the bubbles to burst. The bursting bubbles rupture into hundreds or thousands of micro-droplets. The micro-droplets are used together with the aqueous froth to coalesce with or otherwise bind with contaminants in the air stream. An optional feature is that massive particles greater than three microns in diameter are removed by inertial impaction, whereby those heavy particles collide with the walls of serpentine shaped vanes of a mist eliminator. The method and apparatus are capable of filtering chemical and biological warfare agents out of an air stream. The invention is also useful in removing contaminants from industrial air streams.

8 Claims, 9 Drawing Sheets

12; # METHOD AND MEANS FOR SIMULTANEOUSLY GENERATING AN AQUEOUS FROTH AND NUMEROUS MICRO-DROPLETS FOR USE IN FILTERING A CONTAMINATED AIR STREAM

CROSS-REFERENCE TO RELATED APPLICATION

This application claims the benefit of and priority from U.S. provisional application Ser. No. 60/786,593 filed Mar. 28, 2006.

FEDERALLY SPONSORED RESEARCH

This invention was first reduced to practice with funding from the Pacific International Center for High Technology Research, Hawaii Technology Development Venture/Office of Naval Research (PICHTR, HTDV/ONR).

BACKGROUND AND SUMMARY OF INVENTION

The present invention relates generally to an aqueous froth air filter. More particularly, the present invention provides a significant improvement over my U.S. Pat. Nos. 6,616,733 and 6,872,240, incorporated herein by reference, in the manner of generating the aqueous froth and micro-droplets used to accomplish the filtering of a contaminated air stream.

It has been discovered that the aqueous froth filter systems of my earlier '733 and '240 patents have limited overall filtering efficiency, described in detail below. The '733 patent teaches a system which occasionally generates a froth that includes an excessive percentage of large bubbles in the froth, which detract from the overall filtering performance, as described below. The '240 patent teaches a system wherein micro-droplets are added to the aqueous froth by a series of fogger nozzles. The numerous micro-droplets contribute to the overall effectiveness of the system, but require the use of an air compressor with a fogger nozzle array. The nozzle array is subject to periodic fouling of nozzles and the air compressor is subject to failure, reducing overall filtering efficiency.

The present invention overcomes the above-described problems with the prior art and, in addition, provides considerably higher overall filtering efficiency. The present invention essentially eliminates the generation of unduly large bubbles (the main weakness of the '733 patent) in part by using a series of saturated mesh panels wherein the mesh openings are small and prevent formation of large bubbles. Large bubbles are also prevented in the present invention by the deliberate bursting of bubbles. The present invention also eliminates the array of fogger nozzles and air compressor required by the '240 patent, while still achieving the generation of micro-droplets which cooperate with the aqueous froth. The present invention generates a much wider micro-droplet diameter and mass distribution than the prior art array of fogger nozzles. Micro-droplets of different diameter and mass have different momentum in the moving air stream, facilitating collision coalescence between micro-droplets, and removal from the air stream by inertial impaction on the surfaces of the filter. The enormous number of micro-droplets generated by the present invention is achieved by intentionally causing the aqueous froth bubbles to burst and reform between and downstream of each saturated mesh assembly. As the bubbles are intentionally caused to burst, each bursting bubble ruptures into hundreds or thousands of micro-droplets. These micro-droplets are used downstream in the system to coalesce with or to otherwise bind with contaminants in the air stream, and then to remove those contaminants from the air stream.

The array of saturated mesh assemblies of the present invention generates an aqueous froth having uniformly small bubbles, which enables a high level of filtering efficiency. Simultaneously, the array of saturated mesh assemblies, interacting with the contaminated air stream flowing therethrough, causes bursting and reforming of bubbles preferably two or more times, creating an extremely large number of micro-droplets to interact with contaminants.

An optional aspect of the invention is to separately filter large particles of contaminant; i.e., particles greater than 3 microns in diameter. These large particles are separated by momentarily increasing the velocity of the contaminated air stream before the air stream encounters the aqueous froth. While the air stream velocity is momentarily increased, these large particles are removed by "inertial impaction," i.e., contact with a high efficiency filter.

It is significant to note that the present invention is uniquely capable of filtering biological and chemical warfare agents, such as anthrax spores and other deadly agents, from the air stream. Decontamination foams have been developed to kill anthrax spores and many other deadly agents, after those agents have contacted walls and floors and contaminated a building. The present invention acts as a safeguard in the HVAC system to filter out and kill the anthrax spores, for example, prior to contamination of the walls and floors of the building!

The present invention may also be used as an industrial filter for removing a variety of contaminants in numerous industrial applications.

A primary object of the invention is to provide a method and apparatus for increasing the overall filtering efficiency of an aqueous froth filter.

A further object of the invention is to provide an aqueous froth filter which simultaneously generates a froth having relatively uniformly small bubbles and which also generates numerous micro-droplets of different radii, both of which enhance the overall efficiency of the filtering system.

A further object of the invention is to provide an array of spaced apart saturated mesh assemblies which interact with a contaminated air stream to simultaneously generate a froth having a relatively uniform size of small bubbles and generate numerous micro-droplets of different radii, both of which significantly increase filtering efficiency.

A further object is to provide a high efficiency aqueous froth filter capable of filtering chemical and biological warfare agents from a contaminated air stream.

Another object is to provide a high efficiency aqueous froth filter capable of filtering a variety of contaminated, industrially created air streams.

A further object is to increase overall filtering efficiency of an aqueous froth filter by momentarily increasing the velocity of the contaminated air stream to separately filter large particles by inertial impaction.

A further object is to increase overall filtering efficiency of an aqueous froth filter by momentarily reducing the velocity of the contaminated air stream to separately filter less massive particles by diffusion.

Other objects and advantages will become apparent from the following description and drawings, wherein:

DETAILED DESCRIPTION OF THE DRAWINGS

In the following description, specific material compositions are representative of the preferred embodiment only, and should not limit the scope of the invention.

Figure 1A:
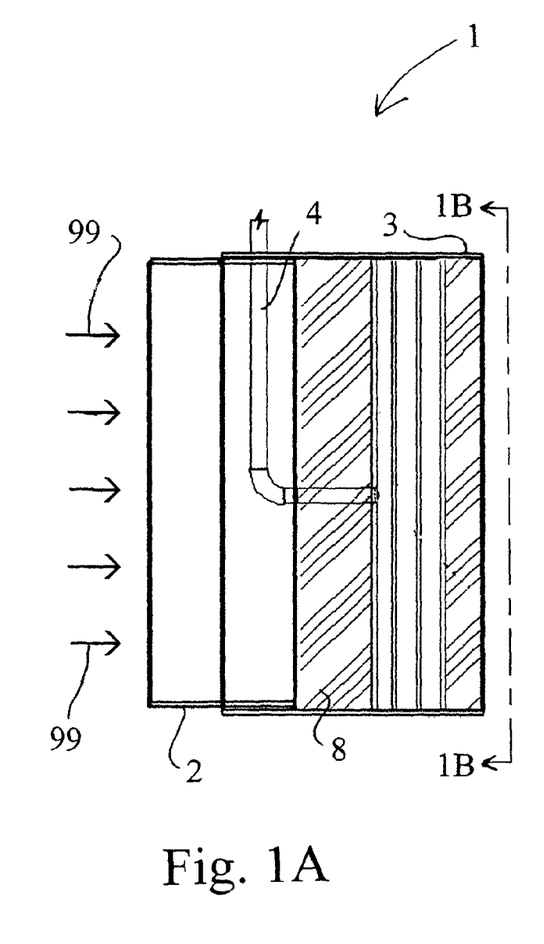
FIG. 1A is a side view of the preferred embodiment of the froth generator.
Figure 1B:
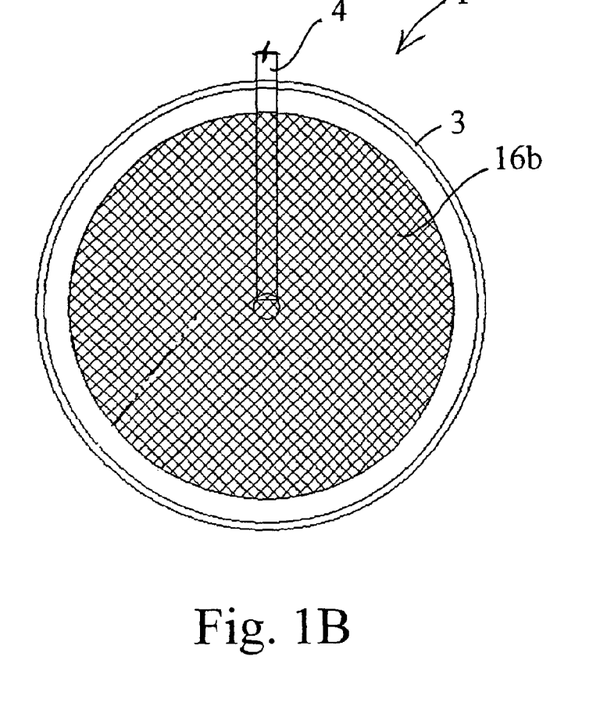
FIG. 1B is a section on the line 1B-1B of FIG. 1A.

The preferred embodiment of the invention is shown in FIGS. 1A and 1B in exemplary form as an improved means of generating an aqueous froth and introducing a wide-spectrum of filtering or decontamination solution droplet radii into a contaminated air stream for a high-efficiency sub-micrometer aerosol filtration device to remove, sequester, and kill biological warfare (BW) agent aerosols, and to remove, sequester, and neutralize chemical warfare (CW) agent aerosols and gasses. FIG. 1A is a side view, partially in section, of the preferred embodiment of the froth generator (which also generates numerous micro-droplets) shown generally as 1. FIG. 1B is an end view of the preferred embodiment from a downstream perspective.

Figure 2:
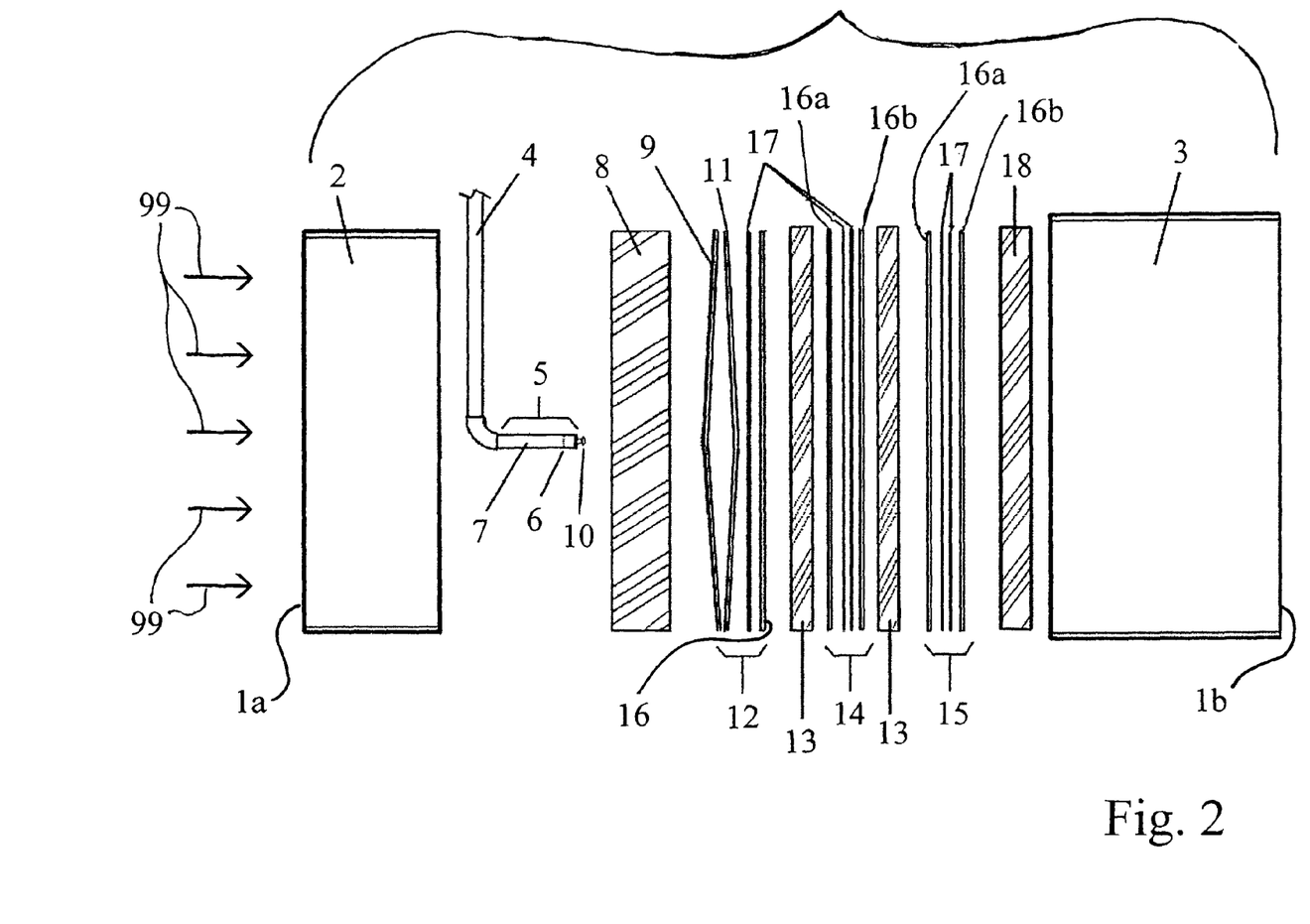
FIG. 2 is an exploded view of the components in the preferred embodiment of the froth generator.

FIG. 2 is an exploded view of the components in the preferred embodiment of FIGS. 1A and 1B. The froth generator 1 is generally cylindrical with open ends, namely, inlet end 1a and outlet end 1b. The outside diameter (O.D.) of a stainless steel cylinder 2 fits within the inside diameter (I.D.) of a cylindrical stainless steel froth-generator body 3 to provide a means to mechanically support the internal components described below.

The decontamination or filtering solution is supplied to a spray nozzle 5 through quarter-inch O.D. stainless steel filtering solution distribution tubing 4 that passes through the wall of the cylindrical flange 2 and the wall of the cylindrical froth generator body 3. Decontamination solution is distributed through the filtering solution spray nozzle 5 that has eight 0.0625" filtering solution spray jets 6 equally spaced around a 0.25" stainless steel tube 7, 0.1" from the end of tube 7, concentric with, and at a 10° angle from and perpendicular to, the linear axis of the tube 7, toward the downstream end of tube 7. The spray nozzle 5 passes through a ¼" hole in the center of a first coarse mesh stainless steel screen 9 and is mechanically fastened to the center of a second coarse mesh stainless steel screen 11, by a stainless-steel screw 10 that penetrates the center of the second screen 11. The first stainless steel screen 9 is slightly cone-shaped with the top of the cone pointed upstream (to the left in FIG. 2). The second screen is slightly cone-shaped with the top of the cone pointed downstream (to the right in FIG. 2). Both cone-shaped screens 9 and 11 together produce a pocket for the spray nozzle 5 that closes in on itself around the perimeter. The spray jets 6 spray out from the center of the screens to evenly saturate coarse mesh stainless-steel screens 9,11 and fine mesh polymeric screens (described below) in three screen or mesh assemblies 12, 14 and 15 downstream of the spray nozzle 5.

A one-inch wide cylindrical polymeric spacer 8 separates the three screen assemblies 12, 14 and 15 from the mounting flange 2. The quarter-inch wall thickness of spacer 8 provides structural support for the screen assemblies 12, 14 and 15.

A contaminated air stream shown by arrows 99 is drawn by relative low pressure through three saturated screen or mesh assemblies 12, 14 and 15, preferably spaced ¼" apart. The saturated mesh assemblies may be spaced apart other distances, but the preferred spacing is 0.15 to 0.30 inches. The first screen or mesh assembly 12 consists of two conical screens 9 and 11, one fine mesh polymeric screen 17 and one flat coarse mesh stainless steel screen 16. Quarter-inch cylindrical polymeric spacers 13 separate the screen or mesh assemblies. The other two screen or mesh assemblies 14 and 15 each consist of one flat, upstream coarse mesh stainless steel screen 16a, two fine-mesh polymeric screens 17, and one flat, downstream coarse-mesh stainless steel screen 16b. The coarse mesh stainless steel screens 16 preferably have mesh openings of between 0.1 and 0.15 inch. The polymeric layers have mesh openings preferably between 0.05 and 0.075 inch. The velocity of incoming contaminated air stream as it flows through said mesh openings is greater than 500 feet per minute (fpm), and preferably between 800 and 1,000 fpm.

A one-half-inch cylindrical polymeric spacer 18 provides structural support and maintains modest compressive force through the screen assemblies 12, 14 and 15 with the one-inch spacer 8 by friction fit in the downstream end of the froth generator body 2.

Bubbles are continuously produced as the air flows through the wire loops of the mesh assemblies that are saturated with decontamination or filtering solution. Those bubbles burst and reform at each saturated mesh assembly downstream of the first assembly 12. As the bubbles burst, their remnants form numerous super-and-sub-micrometer droplets of decontamination solution in the air stream. As the froth progresses through the saturated mesh matrix, bubbles are reformed, each encapsulating a discrete volume contaminated air, decontamination solution vapor, and decontamination solution micro-droplets. The air velocity relative to the micro-droplets in the air is reduced inside the bubbles. The smallest micro-droplets evaporate, increasing the filtering solution vapor pressure in the air inside the bubbles. Micro-droplets with sufficient mass settle out of the air by the acceleration of gravity. Droplets upon which the buoyant effects of air molecules overcome the acceleration of gravity remain suspended in the air inside the bubbles.

Figure 3:
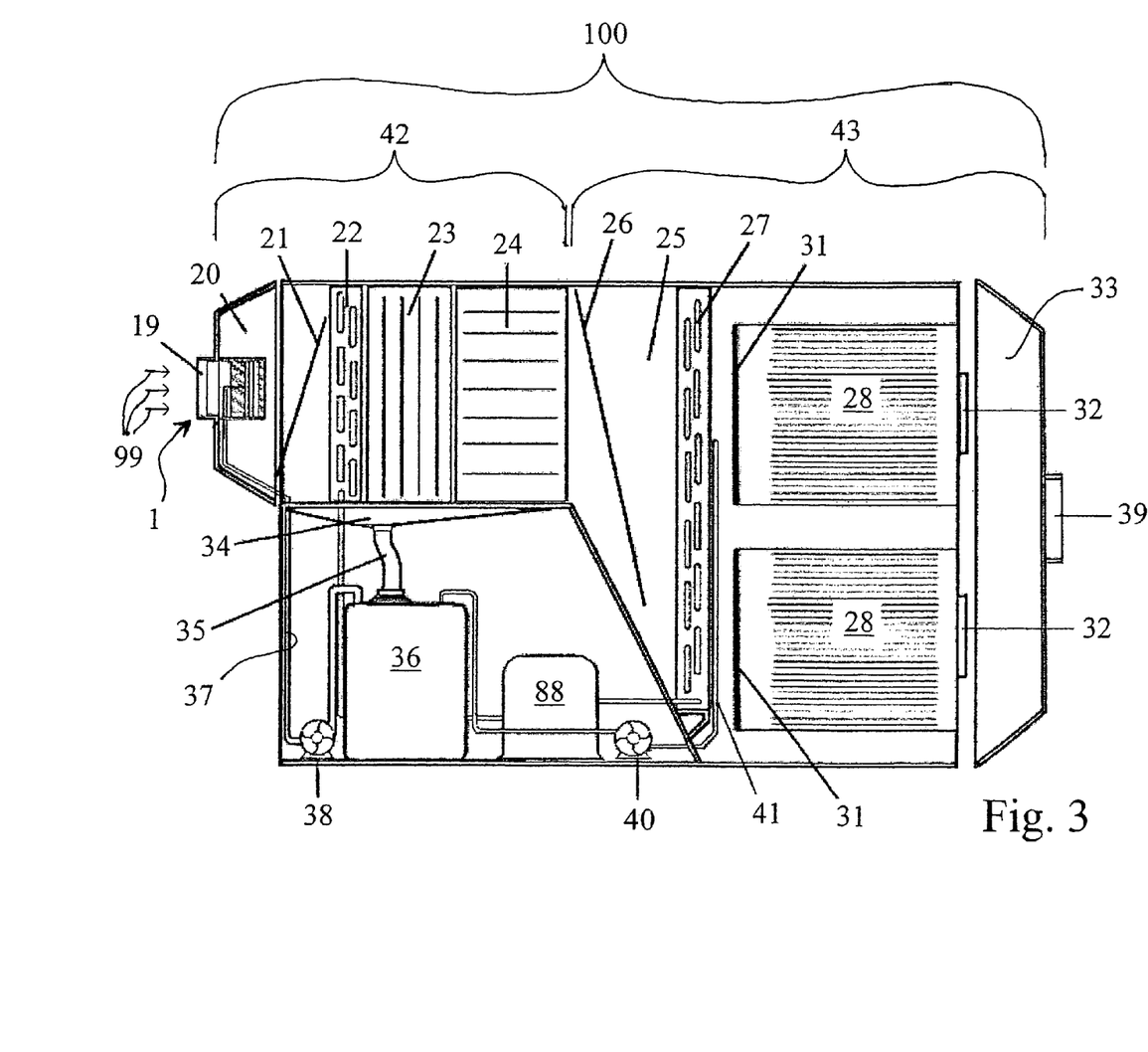
FIG. 3 is an exploded view, from the side, of the components in the aqueous froth chem/bio aerosol filter.

As shown in FIG. 3, the froth generator 1 is shown at the inlet end of filter assembly 100. The filter assembly 100 removes super-and-sub-micron contaminant aerosols from a contaminated air stream 99. More massive contaminant aerosols entrained in the air stream are carried outside the airflow streamlines by their own momentum and are removed by inertial impaction, as described below. Less massive contaminants are removed downstream by diffusion and contact coalescence, described below.

The froth generator 1 of the invention is located in inlet plenum 20. The outside diameter of the flange 2 (FIG. 2) in the froth generator 1 fits inside an air-inlet duct 19 in the inlet plenum 20, and provides a mechanical connection that joins the froth generator 1 (having the saturated mesh panel assemblies 12, 14 and 15) to the air-inlet duct 19, and establishes fluid communication for the introduction of contaminated air stream 99 into the filter 100 through the air inlet duct 19 and sequentially through the froth generator 1.

The chem/bio filter 100 uses a fluid pump 38 to transfer a chemical-and-biological decontamination (or filtering) solution from the filtering solution reservoir 36 through distribution tubing 37 to froth generator 1 (as shown in FIGS. 1A, 1B and 2) extending from a six-inch air inlet duct 19 in an inlet plenum 20. The froth generator 1 consists of a cylindrical flange 2, a cylindrical froth generator body 3, a filtering solution distribution nozzle 5, three assemblies of four screens each, and a variety of spacers, as described below.

The present invention is limited to the froth generator 1, with one exception. Most of the filtering methodology and apparatus downstream of the froth generator is prior art, and is described only briefly herein.

One aspect of the present invention that is downstream of froth generator 1 is the "inertial impaction" aspect of the invention. The "inertial impaction" refers to the filtering of large particles, which is defined as particles greater than 0.3 microns in diameter, by the serpentine shaped vanes of mist eliminator 23. The contaminated air stream 99 is caused to enter the inlet 19 as shown by arrows 99 (FIGS. 2,3) at relatively high velocity. The high velocity (more than 500 fpm and preferably 800-1,000 fpm) is achieved by sizing the cross sectional area of inlet duct (for example, a six inch diameter) much smaller than the cross-sectional area of transition plenum 25, which has more than 2.5 times the cross-sectional area of inlet duct 19. The heavy particles, moving at high velocity, collide against the serpentine walls of mist eliminator 23 and are easily separated. The partially decontaminated air stream reduces its velocity considerably (to about 50 fpm) prior to entering mist eliminators 28 where lighter particles are subsequently filtered as described below.

Figure 6:
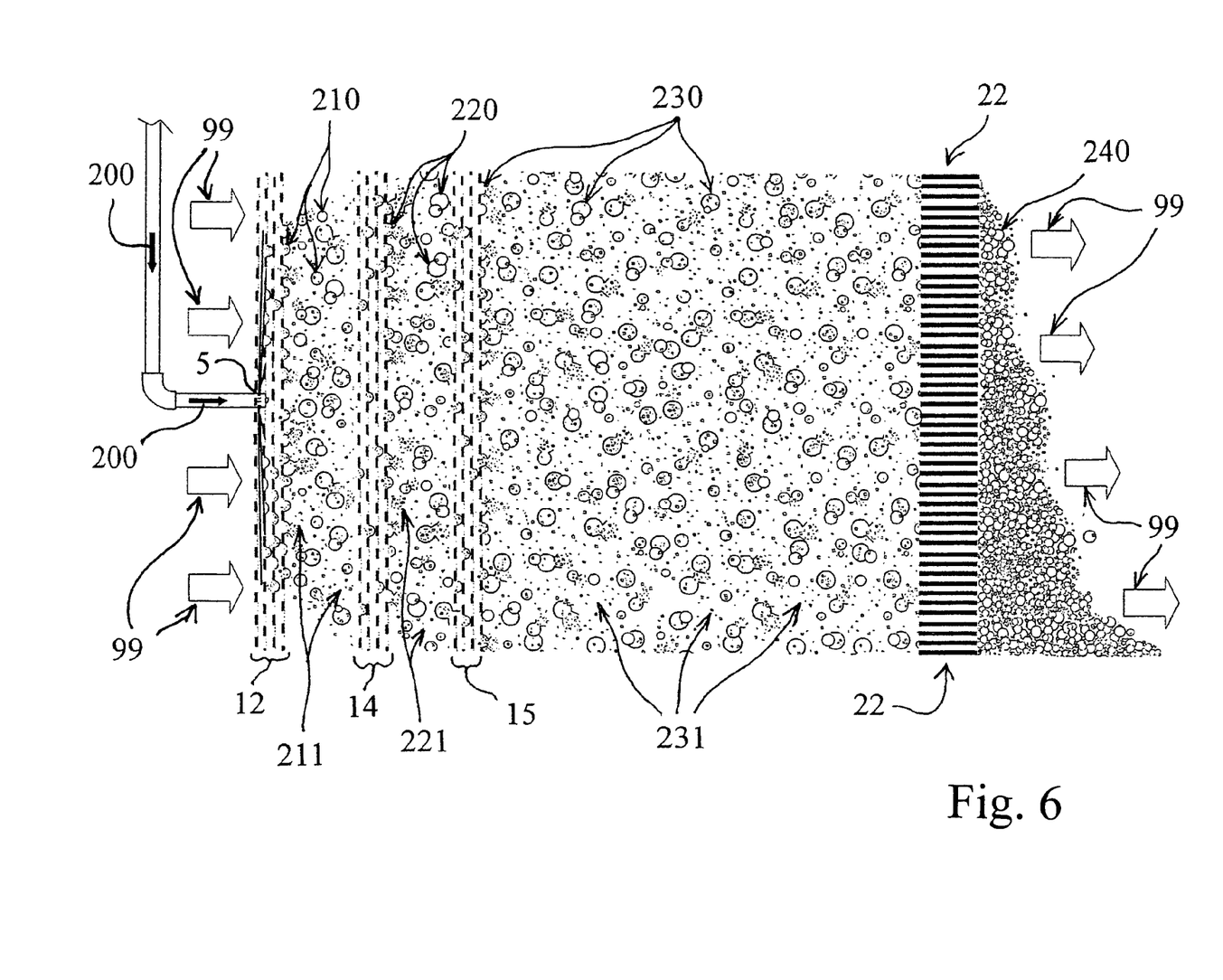
FIG. 6 is a schematic illustration showing formation of the froth and micro-droplets.

FIG. 6 is a simplified schematic representation illustrating the interaction of the contaminated air stream 99 with the three saturated mesh assemblies 12, 14 and 15 shown in FIG. 2. As the contaminated air stream 99 flows along a straight flow path shown by arrows 99 through saturated mesh assembly 12, numerous small bubbles, shown generally as 210, are formed. Saturated mesh assembly 12 is kept constantly saturated with filtering solution 200 pumped through nozzle 5. The small bubbles 210 burst into numerous fragments or micro-droplets 211. In the preferred embodiment, most bubbles are caused to burst. At least some of the bubbles must be caused to burst to produce the needed micro-droplets. As bubbles 210 and micro-droplets contact saturated mesh assembly 14, a second series of reformed bubbles 220 is generated adjacent to and downstream of assembly 14. Reformed bubbles 220 are caused to burst by the relatively high velocity of contaminated air stream 99, forming numerous micro-droplets 221. Saturated mesh assembly 14 is kept saturated by bubbles 210 and micro-droplets 211.

Bubbles 220 and micro-droplets 221 contact the third saturated mesh assembly 15, constantly moisten or saturate the assembly 15, and bubbles 220 and micro-droplets 221 are reformed into a third series of small bubbles 230. As reformed bubbles 230 move toward cooling or refrigerant coil 22, some burst to form micro-droplets 231; the bubbles 230 are cooled and are reduced in size to a heavy, dense foam 240. Many of the contaminants have coalesced inside foam 240 at this stage, and simply drain downwardly through drain line 35 (FIG. 3) into tank 36. As air stream 99 flows through cooling coil 22, it moves into the second stage of the filtering system, which is not part of the present invention (except for the inertial impaction aspect of the invention).

FIG. 6 illustrates the case of using 3 saturated mesh assemblies, spaced apart along the flow path of air stream 99, in which the bubbles reform twice. The invention applies to the general case of n assemblies wherein the bubbles reform n-1 times.

In FIG. 3, a column of filtering solution bubbles (not shown in FIG. 3 for clarity), produced by the froth generator 1, encounters an angled and perforated screening plate 21 that allows a portion of the column of bubbles to go straight and deflects a portion of the bubbles to evenly distribute the aqueous froth over the cross-sectional area of a cold refrigerant coil 22.

The froth passes over endothermic refrigerant coils, cooling the froth and the air inside the bubbles of the froth, and increasing the filtering solution vapor pressure. Decontamination solution initially condenses onto the contaminants in the air inside the bubbles by heterogeneous nucleation. Continued condensation and collision coalescence increases droplet size and mass. A portion of the froth, droplets, and vapor condense onto the cold evaporative coils and drain into the decontamination solution reservoir, as taught in prior art '240 patent.

Figure 4:
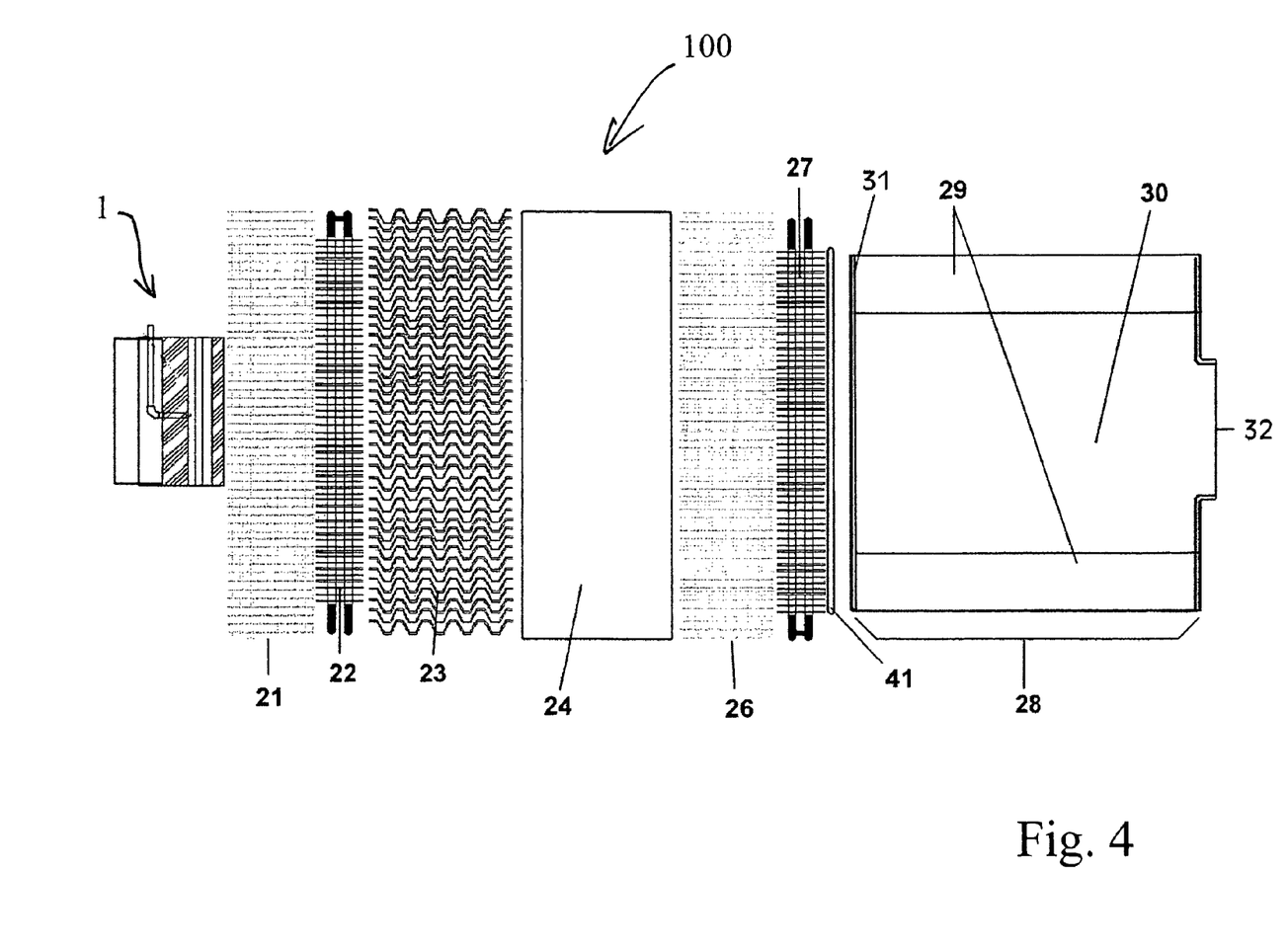
FIG. 4 is a top view of the components in the aqueous froth chem/bio aerosol filter of FIG. 3.

FIG. 4 is a top view (in section) of the chem/bio filter 100 of FIG. 3. Closely echeloned, and generally serpentine shaped, angled vanes of a vane-type mist eliminator 23 are positioned adjacent to and downstream of refrigerant coil 22. The froth remaining in the air stream after the cold refrigerant coils 22 is de-watered on vanes of the mist eliminator 23. Downstream of, and adjacent to, the cold refrigerant coils 22, cool air flowing between the vanes, and cool fluid draining from the vanes, cool the vanes of the mist eliminator 23, increasing the time that heat is removed from the air stream and increasing condensation of decontamination solution vapor onto the contaminants and micro-droplets entrained in the air stream. The most massive micro-droplets entrained in the air stream are removed by inertial impaction on the serpentine shaped vanes of the mist eliminator 23 since the massive particles are flowing too fast to follow the serpentine pathway without colliding with one of the vanes. Decontamination solution with trapped contaminants (including large contaminants larger than 0.3 microns in diameter) that condenses and collects on the vanes of the mist eliminator 23, drains by way of a drain pan 34 shown in FIG. 3, through the drain hose 35 back into the decontamination solution reservoir 36. The drain pan 34 forms the top of a utility compartment 37 where the filtering solution reservoir 36, filtering solution transfer pumps 38 and 40 and a refrigerant compressor 39 is located, out of the contaminated air stream.

Super-and-sub-micron-sized decontamination solution droplets, a portion of which contain captured contaminants, that remain entrained in the air stream after the vane-type mist eliminator 23, enter a combination mesh mist eliminator 24. The combination mesh mist eliminator 24 consists of layers of stainless steel mesh interwoven with fiberglass fibers. The massive micro-droplets remaining in the air stream are removed by inertial impaction and interception on the wires and fibers of the combination mesh mist eliminator 24. The decontamination solution micro-droplets, a portion of which contain captured contaminants, that impact onto, or are intercepted by, the wires and fibers of the combination mesh mist eliminator 24 coalesce until the acceleration of gravity causes the filtering solution to drain back into the filtering solution reservoir 36.

As shown in FIG. 3, the less massive micro-droplets that remain in the air stream after the combination mesh mist eliminator 24 enters a transition plenum 25. Transition plenum 25 increases in cross-sectional area from the size of the inlet section 42 which forms the first stage of the filter to a size at least 2.5 times larger in the second stage of the filter. The air stream with entrained micro-droplets, a portion of which contain captured contaminants, encounters an angled and perforated deflection screen 26 which allows a portion of the air stream to continue straight and deflects a portion of the air stream to the lower half of the transition plenum 25. The velocity of the air stream is reduced by more than 50% in the increased cross-sectional area of the transition plenum 25.

The air stream, at reduced velocity with entrained micro-droplets, a portion of which contain captured contaminants, pass through an exothermic refrigerant coil 27. The hot refrigerant coil 27 replaces the heat removed in the cooling or nucleation stage, as described in prior art '240 patent, increasing the Brownian motion of the micro-droplets remaining in the air stream and reducing the relative humidity of the air stream.

A heat exchanger between the refrigerant condenser coil 27 and the filtering solution reservoir 36 replaces the heat removed from the filtering solution as it passed over the cold refrigerant coil 22. The heat exchanger consists of a second fluid transfer pump 40 located next to a refrigerant compressor 88, a stainless steel heat transfer coil 41 located co-lateral to, and immediately downstream of, the refrigerant condenser coil 27, and fluid transfer tubing to circulate the filtering solution through the heat exchanger coil 41 and back to the filtering solution reservoir 36. The heat exchanger helps to maintain the thermal gradient between the incoming air stream, the filtering solution, and the cold refrigerant coil 22 that increases heterogeneous nucleation and condensation of decontamination solution vapor onto the contaminants and decontaminant solution micro-droplets in the air stream.

The air stream, at reduced velocity of less than 50 fpm and increased Brownian motion with entrained micro-droplets, a portion of which contain captured contaminants, enter two cylindrical coalescing fiber mist eliminators 28. The air stream enters the outer, cylindrical walls of mist eliminators 28 at a face velocity of preferably less than 10% of inlet velocity, i.e., less than 50 fpm. This reduced velocity is achieved since the surface area of mist eliminators 28 (11.5 square feet) is more than 20 times the cross-sectional area of inlet duct 19. The coalescing fiber mist eliminators 28 consist of 10-micron fibers parallel to each other, wound around a cylindrical perforated metal screen to provide structural support. The hydrophobic fibers form cylindrical walls two-inches thick. A cylindrical perforated metal screen on the outside of the fibers contains and provides structural support to the hydrophobic fibers. Heat-driven collisions between air molecules and filtering solution micro-droplets impart erratic paths (Brownian motion) to the micro-droplets, as the micro-droplets diffuse among the hydrophobic fibers of the mist eliminators 28. The air stream passes through the coalescing fiber cylinder walls 29 (FIG. 4) and enters an airflow passageway 30 in the center of the cylindrical mist eliminators 28. The micro-droplets contact and coalesce onto the fibers of the mist eliminators 28. The decontamination solution micro-droplets, a portion of which contain captured contaminants, that coalesce onto the hydrophobic fibers of the coalescing fiber mist eliminators 28 accumulate until the acceleration of gravity causes the filtering solution to drain to the bottom of the mist eliminators 28. The upstream ends of the two cylindrical mist eliminators are sealed with a stainless-steel plate 31. The downstream ends of the cylindrical mist eliminators each have a six-inch air-outlet duct 32, which provides fluid communication with an outlet plenum 33. The air stream flows out an airflow exhaust duct 39, six-inches in diameter, in the outlet plenum 33.

Novel features of the chem/bio air filter, illustrated in FIG. 3, include a first stage 42 that is characterized by relatively small cross-sectional area in contrast to a second stage 43 characterized by a larger cross-sectional area. The small cross-sectional area of the first stage 42 maintains high airflow velocity of more than 500 fpm and preferably 800-1,000 fpm to enable inertial impaction of large particles in the beginning of the filtration process. The larger cross-sectional area of the second stage 43 is more than 2.5 times the cross-sectional area of first stage 42, and slows the air stream significantly. The air stream velocity is further reduced to about 50 fpm (less than 10% of inlet velocity) because of the large surface area of mist eliminators 28, as noted above, to enable removal of less massive aerosol contaminants by diffusion and contact coalescence in the end of the filtration process. As used herein and in the claims, the phrase "high velocity" means more than 500 fpm, and the phrase "low velocity" means less than 50 fpm.

Figure 5:
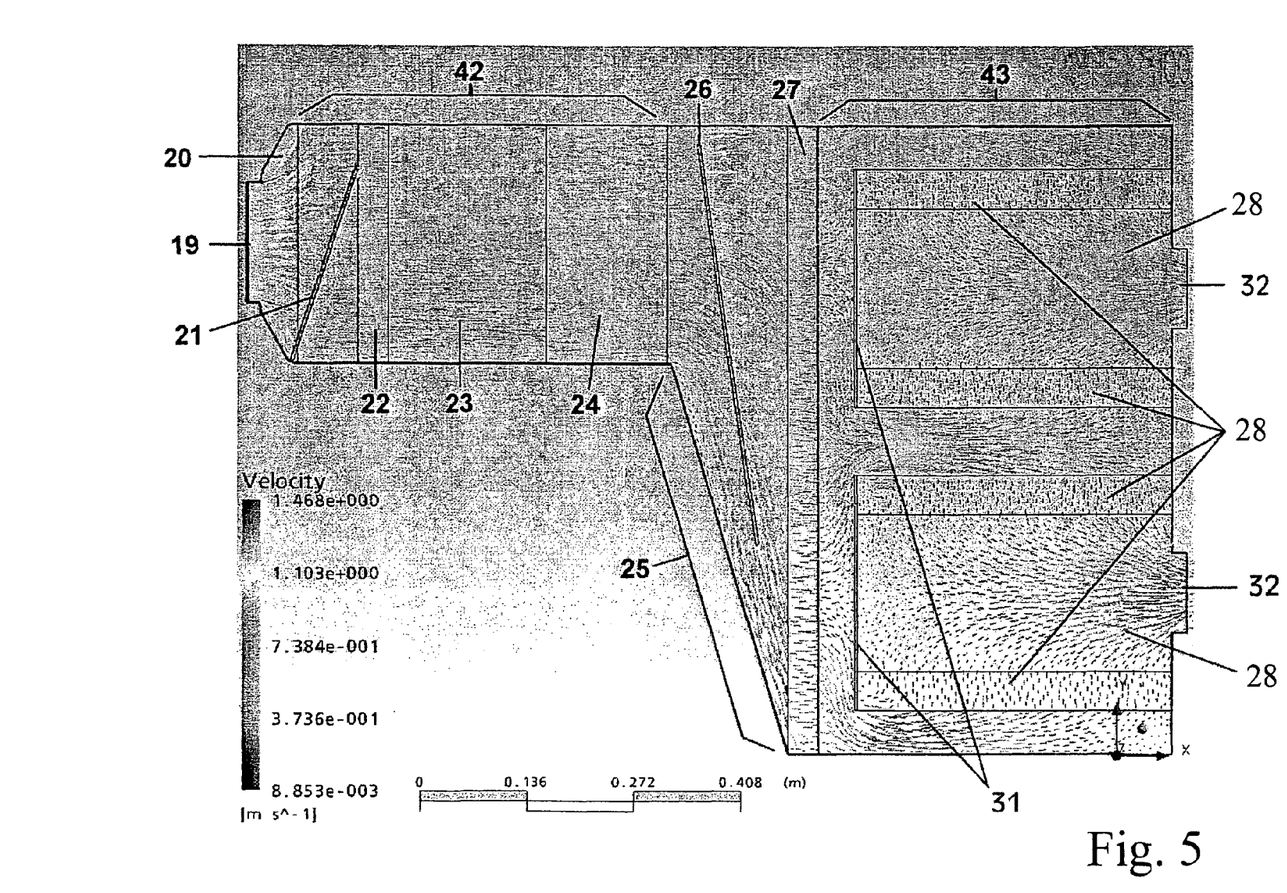
FIG. 5 is a side view of velocity vectors through the aqueous froth chem/bio aerosol filter of FIGS. 3 and 4.

FIG. 5 illustrates velocity vectors of the air stream when passing through the filter. The air stream is initially at relatively high velocity (more than 500 fpm as specified above) in the beginning of the filter to provide the energy required to generate the aqueous froth and force the bubbles through the vanes of the cold refrigerant coil 22. The air stream slows slightly in the vane mist eliminator 23 to remove the energy in the air stream to transport the aqueous froth. The passageways between the wires and fibers of the combo mesh mist eliminator 23 restrict the air flow and increase the velocity of the air stream. The increased velocity of the air stream enables inertial impaction of massive droplets onto the wires and fibers of the mist eliminator 23. The air stream encounters the angled screening plate 26 in the transition duct 25 that deflects a portion of the air stream to the bottom of the second stage air duct or plenum 43. The velocity of the air stream is reduced in the larger cross-sectional area of the air duct or plenum 43. The air stream passes through the hot refrigerant coil 27 and enters the coalescing-fiber mist eliminators 28 at reduced velocity. The air stream, with entrained micro-droplets, diffuses among the hydrophobic fibers of the mist eliminator 28. At reduced air stream velocity, Brownian motion has greater influence on the paths of the micro-droplets than forward momentum. The micro-droplets' erratic paths causes the less massive micro-droplets to contact, and coalesce onto the hydrophobic fibers of the mist eliminator 28. When the micro-droplets accumulate enough mass, the acceleration of gravity causes the filtering solution to drain back into the filtering solution reservoir 36.

Figure 7:
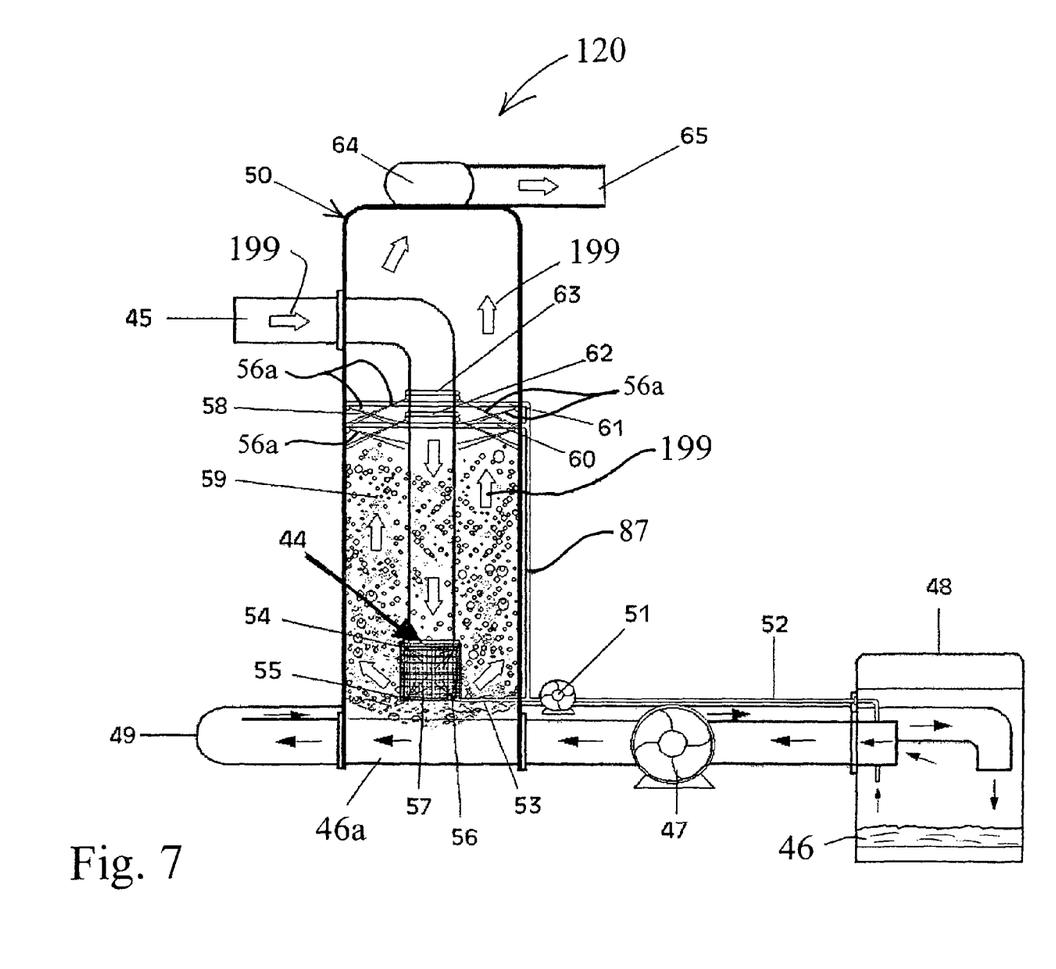
FIG. 7 is a side view of an industrial air filter incorporating the alternative embodiment of the invention.
Figure 8:
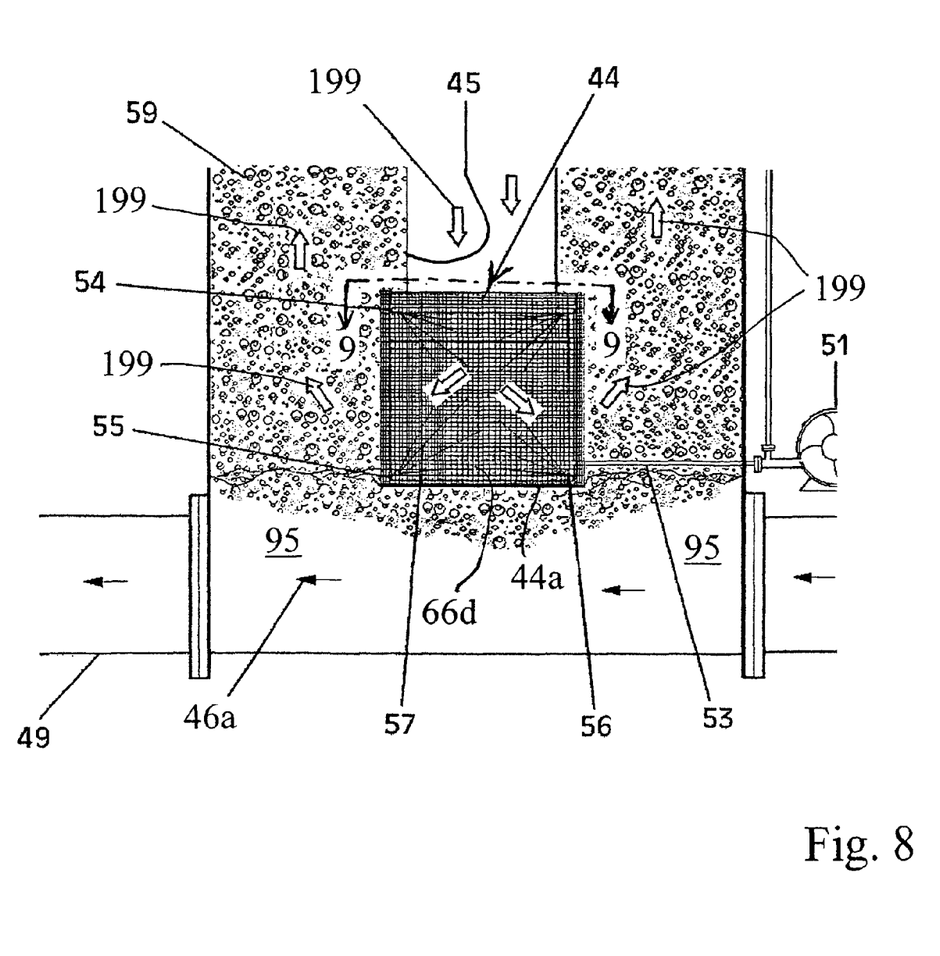
FIG. 8 is a schematic representation of the froth (and micro-droplet) generator portion of the industrial filter of FIG. 7.
Figure 9:
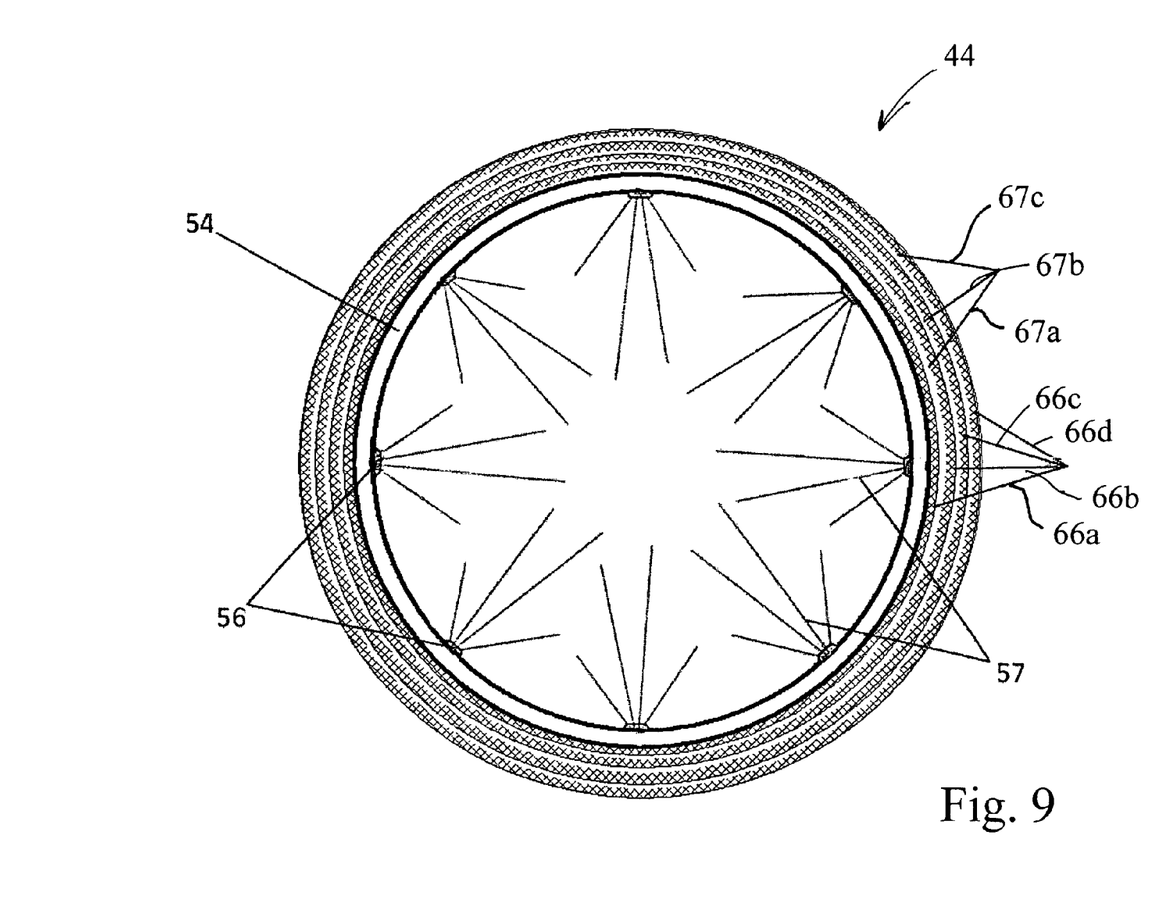
FIG. 9 is a top view on the line 9-9 of FIG. 8.

Listed below are dimensions of the preferred embodiment shown in FIG. 3:

Inlet duct 19=6 inch diameter
Inlet plenum 20=12 inch×17 inch
First stage 42=12 inch×17 inch
Transition duct 25=12 inch×17 inch×32 inch
Second stage 43=32 inch×17 inch
Outlet plenum 33=32 inch×17 inch
Outlet duct 39=6 inch diameter Description—Alternative Embodiment for Industrial Applications An alternative embodiment of the froth (and micro-droplet) generator 44 of the invention is shown in FIGS. 7-9 in exemplary form as an improved means of generating an aqueous froth and introducing a wide spectrum of filtering solution micro-droplet radii into a contaminated air stream 199 in an industrial air filter 120 to decontaminate air steam 199. Air stream 199 may contain toxic industrial chemicals, hazardous bio-active aerosols, acid aerosols formed from sulfur-oxides (SOx), greenhouse gasses from flue-gas from coal-fired industrial boilers, nuisance and corrosive dusts and mists, or valuable recoverable chemicals or metals from an exhaust-gas stream.

The froth generator 44 of the invention is illustrated in FIGS. 7-9 as a cylindrical extension of contaminated air duct 45 in an industrial wet scrubber. A series of four concentric cylindrical screens 66a, 66b, 66c and 66d (FIG. 9) separated by spacers extends from the end of the air duct 45 to the surface of a flowing stream of filtering solution 46a. The froth generator and micro-droplet generator 44 is a series of concentric, cylindrical mesh screen assemblies 66a-66d as contrasted with the essentially flat panel assemblies 12, 14 and 15 of FIG. 2. The lowermost end 44a (FIG. 8) of generator 44 extends downwardly into a reservoir 95 of filtering solution. The contaminated air stream 199 (FIG. 8) exits air duct 45 and either flows along a horizontal flow path through saturated mesh assemblies 66a-66d or along a downward and radially outward flow path through filtering solution 46 in reservoir 95. Air stream 199 flows upwardly through scrubber enclosure 50 into exhaust duct 65.

The saturated mesh assemblies 66a-66d are spaced apart along the horizontal flow path of air stream 199 and each include two coarse mesh, cylindrical stainless steel screens. No polymeric screens are used in this embodiment. Each cylindrical screen has mesh openings between 0.35 inch and 0.65 inch. Air stream velocity through these openings is at least 500 fpm and preferably 800 fpm to 1,000 fpm.

A fluid pump 47 pumps filtering solution 46 from a filtering solution settling tank 48 through a filtering solution pipeline 49, to the bottom of a wet-scrubber enclosure 50. A second smaller fluid pump 51 pressurizes a distribution pipe network that supplies filtering solution from the filtering solution settling tank 48 to several arrays of spray nozzles. The main filtering solution distribution pipe 52 bifurcates between the fluid pump 51 and the wet-scrubber enclosure 50. The first distribution pipe 53 continues straight into the wet-scrubber enclosure 50 to supply filtering-solution to the two arrays of spray nozzles 55 in the froth generator 44, the second distribution pipe 87 supplies filtering solution to the four arrays of spray nozzles that limit the froth to a predetermined volume.

The first distribution pipe 53 supplies two circular filtering solution distribution pipes 54 and 55 collateral to and concentric with, the cylindrical screen walls, and perpendicular to the linear axis of the froth generator 44. The first circular filtering solution distribution pipe 54 is located at the top of the froth generator 44 and positioned concentric with, and collateral to the end of the contaminated air duct 45. The second circular distribution pipe 55 is located at the interface of the froth generator 44 and the surface of a flowing stream 46a of filtering solution 46, and positioned concentric with, and collateral to, the end of the contaminated air duct 45. The circular filtering solution distribution pipes 54 and 55 each have eight filtering-solution spray nozzles 56 (FIG. 9) positioned to spray a cone-shaped pattern 57 of filtering solution droplets across the air stream (only two droplet patterns are illustrated from each distribution pipe 54 and 55 for clarity) onto the internal froth generator wall 180° from the position of the spray nozzle 56. The filtering solution spray nozzles 56 in the distribution pipe 54 near the top of the froth generator 44 spray at a downward angle onto the internal wall on the opposite side of the froth generator 44. The spray nozzles 56 in the distribution pipe 55 at the bottom of the froth generator 44 spray at an upward angle onto the internal wall on the opposite side froth generator 44.

The contaminated air stream 199 flows through the openings in the saturated mesh panels 66a-66d, separated by spacers 67a-67c forming bubbles that encapsulate a portion of the air stream in each bubble. Collectively the production of bubbles produces an aqueous froth that encapsulates the contaminated air stream. Bursting bubbles introduce super-and-sub-micrometer droplets into the air stream. Bubbles are reformed three times as the froth progresses through the four saturated mesh assemblies, encapsulating the contaminated air, filtering solution micro-droplets, and filtering solution vapor inside the bubbles of the froth.

The volume of the froth is limited by a crossed spray 58 of filtering solution droplets across the top of column of froth 59. Four circular filtering solution distribution pipes, each having eight filtering solution spray nozzles 56a are positioned to limit of the column of froth 59 to a predetermined volumetric level. The two filtering solution distribution pipes 60 and 61 are concentric with, and collateral to, the internal surface of the cylindrical wall of the filter enclosure 50. The first filtering solution distribution pipe 60 is approximately 0.5 meters below the second filtering solution distribution pipe 61. The spray nozzles 56a of both distribution pipes 60 and 61 are directed inward toward the contaminated air duct 45, at a 10° downward angle, so that the horizontal fan spray pattern of the spray nozzles 56a from the two pipes advance across the top of the column of froth 59 in parallel, providing an initial froth limiting spray of droplets from the array of spray nozzles 56a in the lower pipe 60, and a secondary froth limiting spray of droplets from the array of spray nozzles 56a in the upper filtering solution distribution pipe 61. Two additional circular filtering solution distribution pipes 62 and 63 are located concentric with, and collateral to, the outside surface of the contaminated air duct 45, approximately 0.5 meter above the height of the filtering solution distribution pipes 60 and 61 on the internal wall of the filter enclosure 50. The filtering solution spray nozzles 56a of the third and fourth filtering solution distribution 62 and 63 pipes spray horizontal fan-shaped patterns of droplets outward, at a 10° downward angle, so that the horizontal fan spray pattern of the spray nozzles from the two pipes advance across the top of the column of froth in parallel, providing an initial froth limiting spray of droplets from the array of spray nozzles 56a in the lower pipe 62, and a secondary froth limiting spray of droplets from the array of spray nozzles in the upper filtering solution distribution pipe 63, from the contaminated air duct 45 towards the internal wall of the filter enclosure 50. The spray of droplets 58 from the four arrays of spray nozzles, in concert, limit the volume of froth to the predetermined level. The air stream with entrained droplets of filtering solution, some of which may contain contaminants, is drawn by low pressure through a centrifugal droplet separator 64. Massive droplets, entrained in the air stream are removed from the air stream, onto the inner wall of the turbine enclosure of the centrifugal separator 64 and drain into the wet-scrubber enclosure 50. The air stream is exhausted from the wet-scrubber 44 through an exhaust-air duct 65.

Scientific Explanation of Prior Art and Present Invention

Prior art U.S. Pat. No. 6,616,733 teaches using an aqueous froth to remove contaminants from an air stream. The aqueous froth is generated by introducing a contaminated air stream into a filtering solution reservoir through a diffusing means below the surface of the liquid. The froth expands into a vertical column above the filtering solution reservoir. The interface between the contaminated air stream and the filtering solution produces a continuous column of small bubbles that grows at a consistent rate. Pressure drop from introducing air stream below the surface of the filtering solution reservoir is relatively high, being directly related to the amount of water that must be displaced to force the air stream through the filtering solution. Large bubbles also formed by the turbulent interface rise through the column of froth at a several times the rate than the smaller bubbles. Large bubbles have less liquid-to-gas surface area than small bubbles and the faster rate-of-climb through column-of-froth reduce the time-of-contact between the contaminants in the air stream and the filtering solution. Airflow jet-streams through froth column provide an air duct to quickly transport contaminated air through the column-of-froth with little contact with the filtering solution.

Prior art U.S. Pat. No. 6,872,240 teaches using heterogeneous nucleation in addition to the aqueous froth to increase the mass and aerodynamic diameter of the contaminants in the air stream. An array of fogger nozzles atomize a filtering solution with compressed air to introduce a wide-spectrum of filtering solution droplet-radii into an air stream. The air compressor and nozzle array add cost, weight, unnecessary mechanisms that are subject to failure, and unnecessary complexity to the design of the filter.

The advantages to generating an aqueous froth with the froth generator of the present invention, in comparison with introducing the contaminated air stream beneath the surface of the filtering solution reservoir, as taught in U.S. Pat. No. 6,616,733, are numerous. The location of the froth generator in the inlet duct, directly upstream of the nucleation stage straightens the airflow streamlines through the filter, reduces the resistance to airflow (pressure drop) across the filter, and increases aerosol removal efficiency and airflow capacity, over the prior art. The matrix produced by the saturated closely spaced mesh panels form bubbles of approximately the same size. The matrix of mesh panels prevents the formation of large bubbles that carry contaminants through the filter, and increase the liquid-to-gas surface area between the filtering solution and the contaminants in the air stream. The matrix also prevents the formation of airflow jet streams through the aqueous froth column, increasing the time of contact between the filtering solution and the contaminants entrained in the air stream.

Another advantage of the froth generator of the present invention, in comparison with the array of fogger nozzles that atomize filtering solution with compressed air to introduce a wide spectrum of filtering solution droplet radii into an air stream, as taught in U.S. Pat. No. 6,872,240, is the elimination of the air compressor and fogger nozzle array. As the air flows through the openings in the saturated mesh panels, bubbles are formed encapsulating a portion of the air stream in each bubble. Collectively the production of bubbles produces an aqueous froth that encapsulates the contaminated air stream. Bursting bubbles introduce super-and-sub-micrometer droplets into the air stream. Bubbles are reformed as the froth progresses through the saturated mesh panels, encapsulating the contaminated air, filtering solution micro-droplets, and filtering solution vapor inside the bubbles of the froth. The least massive micro-droplets evaporate, increasing filtering solution vapor pressure in the air inside the bubbles. The most massive contaminants or micro-droplets settle out of the air when the acceleration of gravity overcomes the air flow resistance with the surface of the contaminant or micro-droplet. Less massive contaminants or micro-droplets, upon which the buoyant effects of air molecules overcome the acceleration of gravity, remain suspended in the air, inside the bubbles of the aqueous froth.

The advantage of the two-stage air duct of the invention is a first stage air duct with high relative airflow velocity resulting from a small cross-sectional area to facilitate the removal of aerosol with enough mass to overcome airflow cushioning near surfaces in a moving air stream by inertial impaction, and a second stage with low relative airflow velocity resulting from a large relative cross-sectional area of the second-stage air duct to facilitate the removal of aerosol from the air stream that do not have enough mass to overcome airflow cushioning by diffusion and contact coalescence.

The present invention teaches an improved method and provides a means to generate an aqueous froth to remove contaminants from an air stream by forcing the contaminated air stream through a series of saturated mesh panels. Filtering solution is pumped from a filtering-solution reservoir to a series of mesh panels positioned perpendicular to the air flow. A filtering solution distribution system saturates the mesh panels evenly. A contaminated air stream is forced through the saturated mesh panels. As the air flows through the openings in the saturated mesh panels, bubbles are formed encapsulating a portion of the air stream in each bubble. Collectively the production of bubbles produces an aqueous froth that encapsulates the contaminated air stream. Bursting bubbles introduce super-and-sub-micrometer droplets into the air stream. Bubbles are reformed as the froth progresses through the saturated mesh panels, encapsulating the contaminated air, filtering solution micro-droplets, and filtering solution vapor inside the bubbles of the froth. The least massive micro-droplets evaporate, increasing filtering solution vapor pressure in the air inside the bubbles. The most massive contaminants or micro-droplets settle out of the air when the acceleration of gravity overcomes the air flow resistance with the surface of the contaminant or micro-droplet. Less massive contaminants or micro-droplets, upon which the buoyant effects of air molecules overcome the acceleration of gravity, remain suspended in the air, inside the bubbles of the aqueous froth. The invention provides, in exemplary form, a froth generator as an improved means of generating an aqueous froth and introducing a wide spectrum of decontamination solution micro-droplet radii into a contaminated air stream for a high-efficiency sub-micrometer aerosol filtration device to remove, sequester, and kill biological warfare (BW) agent aerosols, and to remove, sequester, and neutralize chemical warfare (CW) agent aerosols and gasses that are captured by the filter, and render non-viable BW or CW agent aerosols that penetrate the filter. The invention also provides, as an alternative example of an improved means of generating an aqueous froth and introducing a wide spectrum of decontamination solution micro-droplet radii into a contaminated air stream, a froth generator for an industrial air filter to decontaminate an air steam containing toxic industrial chemicals or hazardous bio-active aerosols.

The method of the present invention includes transferring a filtering solution from a filtering-solution reservoir through a distribution means to saturate a series of metallic or polymeric-mesh panels positioned across an air duct. A contaminated air stream is forced through the series of saturated mesh panels. Bubbles are continuously produced as the air flows through the wire loops of the mesh panels that are saturated with filtering solution, producing an aqueous froth. A portion of the contaminated air stream is encapsulated inside each bubble of the froth. Bursting bubbles introduce super-and-sub-micrometer droplets of filtering solution into the air stream. As the froth progresses through the saturated-mesh panels, bubbles are reformed encapsulating contaminated air, filtering solution vapor, and filtering solution micro-droplets.

Airflow velocity is reduced, relative to the contaminants and micro-droplets, in the micro-atmosphere created inside each bubble of the froth. The least massive micro-droplets evaporate, increasing the vapor pressure inside the bubbles, enabling heterogeneous nucleation of filtering solution vapor onto the contaminants and micro-droplets in the air, inside the bubbles of the froth. Less massive micro-droplets, upon which the buoyant effects of air molecules overcome the acceleration of gravity, remain suspended in the air inside the bubbles. The most massive contaminants or micro-droplets settle out of the air when the acceleration of gravity overcomes the airflow resistance with the surface of the aerosols, as taught in U.S. Pat. No. 6,872,240.

The aqueous froth is cooled, cooling the micro-atmospheres inside the bubbles of the froth. As the air inside the bubbles cools, heterogeneous nucleation of filtering solution vapor occurs on all the contaminants remaining in the air, inside the bubbles of the froth. Condensation and collision coalescence with other micro-droplets increase the mass and aerodynamic diameter of micro-droplets suspended in the air, as taught in U.S. Pat. No. 6,872,240.

The froth that remains in the air stream is de-watered. More massive micro-droplets are removed from the air stream by inertial impaction. The air stream with the less massive micro-droplets enters a transition duct that increases in cross-sectional area from the relatively small cross-sectional area of the inlet duct to the larger cross-sectional area of the outlet duct. The air stream with entrained micro-droplets is reduced in velocity in the larger cross-sectional area of the outlet duct.

The air stream is heated, replacing the heat removed during the cooling stage, increasing Brownian motion of the aerosols, and reducing relative humidity of the air stream, as taught in U.S. Pat. No. 6,872,240.

A heat exchanger helps to maintain the thermal gradient between the incoming air stream, the filtering solution, and the cooling process that enables heterogeneous nucleation and condensation of filtering solution vapor onto the contaminants and filtering solution micro-droplets in the air stream.

Less-massive micro-droplets are removed from the air stream by diffusion and contact coalescence.

The decontaminated air stream is exhausted from the filter.

The foregoing description of the invention has been presented for the purposes of illustration and description and is not intended to be exhaustive or limit the invention to the precise form disclosed. Modifications and variations are possible in the light of above teaching. The embodiments were chosen and described to best explain the principles of the invention and its practical application to thereby enable others skilled in the art to best use the invention in various embodiments and other various modifications suited to the particular use contemplated. The scope of the invention is to be defined by the following claims.

What is claimed is:

1. A method of generating an aqueous froth from an aqueous filtering solution simultaneously with numerous micro-droplets from said aqueous filtering solution, said micro-droplets having various radii for use in an aqueous froth filtering system which removes contaminants from a contaminated air stream moving along a flow path, comprising the steps:
    providing a plurality of 3 mesh assemblies, said mesh assemblies being spaced apart said flow path of said contaminated air stream,
    saturating said plurality of mesh assemblies with said aqueous filtering solution,
    passing said contaminated air stream through said plurality of mesh assemblies,
    forming an aqueous froth having a large array of bubbles downstream of each of said saturated mesh assemblies as said contaminated air stream flows through each assembly, and
    causing at least some of said bubbles to burst and reform 2 times as said contaminated air stream passes through said 3 saturated mesh assemblies, said bursting bubbles forming said numerous micro-droplets having various radii, wherein each reforming bubble encapsulates a discrete volume of said contaminated air stream, a discrete number of said filtering solution micro-droplets, and a discrete volume of filtering solution vapor.

2. The method of claim 1 wherein each of saturated mesh assemblies comprises first and second stainless steel mesh layers and first and second polymeric layers located between said first and second stainless steel mesh layers.

3. The method of claim 2 wherein each of said stainless steel mesh layers have mesh openings of between 0.1 inch and 0.15 inch, said each of said polymeric layers have mesh openings of between 0.05 inch and 0.075 inch, and wherein said contaminated air stream flows through said openings at more than 500 fpm.

4. The method of claim 3 wherein said contaminated air flows through said openings at between 800 fpm and 1,000 fpm.

5. The method of claim 3 wherein each of said assemblies is spaced apart a distance of between 0.15 inch and 0.30 inch.

6. The method of claim 1 wherein each of saturated mesh assemblies comprises first and second cylindrical, stainless steel mesh layers.

7. The method of claim 6 wherein each of said stainless steel mesh layers have mesh openings between 0.35 inch and 0.65 inch, and said air stream flows through said openings at between 800 fpm and 1,000 fpm.

8. The method of claim 7 wherein 4 mesh assemblies are utilized.

* * * * *